(12) United States Patent
Patland et al.

(10) Patent No.: US 6,943,545 B2
(45) Date of Patent: Sep. 13, 2005

(54) MAGNETIC HEAD TESTER

(75) Inventors: Henry Patland, Los Gatos, CA (US); Wade A. Ogle, San Jose, CA (US)

(73) Assignee: Infinitum Solutions, Inc., Santa Clara, CA (US)

(*) Notice: Subject to any disclaimer, the term of this patent is extended or adjusted under 35 U.S.C. 154(b) by 0 days.

(21) Appl. No.: 10/177,333

(22) Filed: Jun. 21, 2002

(65) Prior Publication Data

US 2003/0234646 A1 Dec. 25, 2003

(51) Int. Cl.[7] .................. G01R 33/12; G01B 5/455
(52) U.S. Cl. ................................................. 324/210
(58) Field of Search ............................... 324/210, 211, 324/212, 232, 235; 29/593; 327/39

(56) References Cited

U.S. PATENT DOCUMENTS

| | | | | |
|---|---|---|---|---|
| 3,733,579 A | * | 5/1973 | Onishi et al. | 360/40 |
| 4,574,234 A | * | 3/1986 | Inbar | 324/76.24 |
| 5,093,751 A | * | 3/1992 | Yuki et al. | 360/25 |
| 5,383,064 A | * | 1/1995 | Harman | 360/45 |
| 5,721,488 A | | 2/1998 | Sakai et al. | 324/210 |
| 5,838,510 A | * | 11/1998 | Inbar | 360/46 |
| 5,854,554 A | * | 12/1998 | Tomita et al. | 324/210 |
| 5,936,789 A | * | 8/1999 | Mukohara | 360/77.04 |
| 6,163,419 A | * | 12/2000 | Sobey et al. | 360/29 |
| 6,225,799 B1 | * | 5/2001 | Gergel et al. | 324/212 |
| 6,594,716 B2 | * | 7/2003 | Nemazie et al. | 710/74 |
| 2001/0048303 A1 | | 12/2001 | Hachisuka et al. | 324/210 |

OTHER PUBLICATIONS

Nichols, M., "Comparison of the QST Noise Test to Other HGA Level Tests", http://www.isiguys.com/Publications/QST%20Noise%20Report.pdf, dated Mar. 26, 2001, printed out Jun. 20, 2002, 12 pages.

Nichols, M., "Noise and Discontinuities in GMR Transfer Curves", Intermag Europe (Apr. 2002), 3 pages.

Nichols, M., "Noise and Non-Linear Transfer Curves in GMR Heads", IEEE (2002), 1 page, BD II.

* cited by examiner

*Primary Examiner*—Jay Patidar
*Assistant Examiner*—Reena Aurora
(74) *Attorney, Agent, or Firm*—Silicon Valley Patent Group LLP (57) ABSTRACT

A magnetic head that includes a magnetoresistive effect read head element is tested by applying a varying magnetic field and measuring the resulting output signals from the read head element. The output signals are digitized and a processor calculates, e.g., the root mean square (RMS) of the signals or performs a Fast Fourier Transform or Autocorrelation on the data to determine if there is noise present. If desired, write and delay events may be performed prior to digitizing the output signals from the read head element to determine if additional noise, which is introduced to the magnetoresistive head from the write element, is present. In one embodiment, the digitizer may be replaced with an RMS meter.

30 Claims, 9 Drawing Sheets

| W | D | R | W | D | R | W | D | R | W | D | R | W | D | R | W | D | R |

Fig. 4A

| R | R | R | R | R | R | R | R | R | R | R | R |

Fig. 4B

| R |

MAGNETIC HEAD TESTER

BACKGROUND OF THE INVENTION

1. Field of the Invention

The present invention relates to testing a thin-film magnetic head with a magnetoresistive effect (MR) read head element.

2. Discussion of the Related Art

In order to increase the recording density in hard drive disks, composite thin-film magnetic heads are being produced with an inductive write head element and a magnetoresistive effect (MR) read head element. The basic concept of magnetoresistive element is that resistance of such element changes as a function of applied magnetic field. Such elements can be produced by using an anisotropic magnetoresistive effect (AMR) element, a giant magnetoresistive effect (GMR) element such as a spin-valve MR element or a tunnel magnetoresistive effect (TMR) element to increase element sensitivity.

A magnetic head assembly with a defective MR element cannot perform normal reproduction operation over the range of magnetic read signals from a disk. Accordingly, it is important to qualify each head by testing the head for instabilities or noise.

There are several known techniques for testing MR elements for noise. Unfortunately, conventional testers are inadequate in several applications. For example, conventional systems typically detect large static changes, often referred to as "hard kinks" in the MR elements, which are magnetic instabilities occurring over a small range of magnetic fields, but fail to recognize other instabilities, such as "soft kinks", which are magnetic instabilities occurring over a large range of magnetic fields. Thus, what is needed is an improved method and apparatus for measuring the performance of magnetic heads that can detect different types of noise, including hard and soft kinks.

SUMMARY

A magnetic head is tested, in accordance with the present invention, by applying a variable external magnetic field to the magnetic head, receiving output signals from the magnetoresistive effect read head element of the magnetic head and digitizing the output signals. In one embodiment, the magnitude of the variable external magnetic field is incrementally varied and in another embodiment, the magnitude is varied continuously. The digitized output signals can then be processed to determine if the magnetic head produces noise. For example, the root mean square (RMS) values of the digitized output signals can be generated or a Fast Fourier Transform or Autocorrelation may be performed on the digitized output signals to analyze the data. In addition, a write and delay event may be performed prior to digitizing the output signals. In other words, a write current is applied to a write element on the magnetic head after which there is a delay prior to digitizing the output signals. By performing write and delay events, the magnetic head may be tested for noises such as popping noise, which occurs from heating and cooling of the write element.

In another embodiment of the present invention, the magnetic head is tested by applying a variable external magnetic field to the magnetic head, receiving at least one output signal from the magnetoresistive effect read head element of the magnetic head and applying the output signals from said magnetoresistive effect read head element to a root mean square (RMS) meter to determine if the magnetic head produces noise.

In another embodiment of the present invention, an apparatus for testing a magnetic head with a magnetoresistive effect read head element includes a variable magnetic field generator for applying a variable external magnetic field to the magnetic head, a low pass filter for coupling to the magnetoresistive effect read head element and receiving output signals from the magnetoresistive effect read head element, and a digitizer coupled to the low pass filter for digitizing the output signals from the magnetoresistive effect read head element. The apparatus further includes a processor coupled to the digitizer for processing the digitized data. The processor may include computer-usable medium having computer-readable program code embodied therein for causing the processor to perform at least one of a root mean square calculation on the digitized output signals, a Fast Fourier Transform and Autocorrelation on the digitized signals to determine if the magnetic head produces noise. In yet another embodiment, the digitizer in the apparatus may be replaced with an RMS meter and is coupled to a processor that determines if the magnetic head under test produces noise.

DETAILED DESCRIPTION

Figure 1:
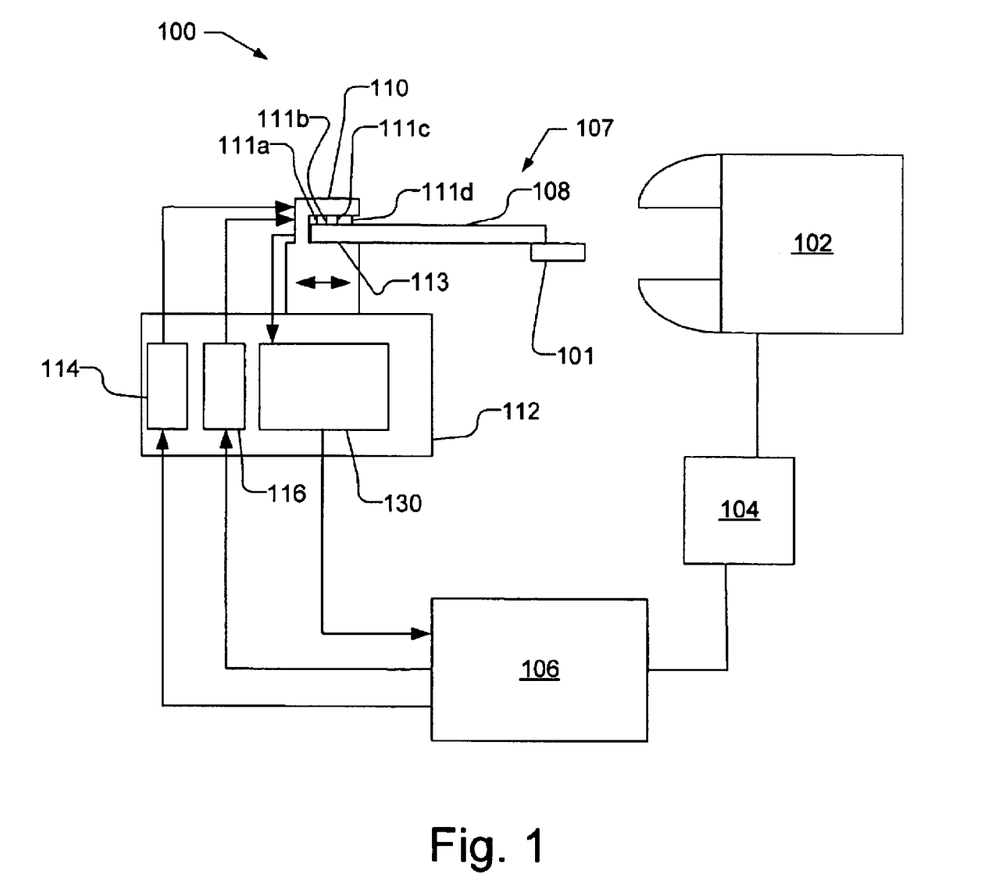
FIG. 1 is a schematic view of a thin-film magnetic head testing device in accordance with the present invention.

FIG. 1 is a schematic view of a thin-film magnetic head testing device 100 that may be used with the present invention. Testing device 100 includes an electromagnetic coil 102, which e.g., is a C-core electromagnetic coil with windings, for producing an external magnetic field that is applied to the composite thin-film magnetic head under test. A power supply 104 is connected to the electromagnetic coil 102 and provides the excitation current to the electromagnetic coil 102. The power supply 104 is connected to and controlled by a processor 106. The processor 106 controls the coil 102, via the power supply 104, to produce a magnetic field, which may be programmable to vary, e.g., to continuously change or incrementally change. Moreover, the parameters of the magnetic field, for example, the magnitude and the cycle length, may be programmable if desired.

The magnetic head 101 under test, which may include an inductive write head element and a MR read head element, is mounted on a suspension 108, composed of a mechanical mounting base and an electrical connector for probe contact. The assembly of the magnetic head 101 and suspension 108 is sometimes referred to generally as head gimbal assembly 107. The head gimbal assembly 107 is mounted on a mounting block 110, which includes probe pins 111a, 111b, 111c, and 111d to make electrical connections to the contacts on the head gimbal assembly 107. An additional electrical connection, i.e., the ground connection, may be made through the contact of upper surface 113 of mounting block and the bottom surface of the suspension 108. The mounting block 110 is movably coupled to the base 112, such that the mounting block 110 and magnetic head 101 can translate towards and away from the electromagnetic coil 102. During testing, the mounting block 110 moves the magnetic head between the electromagnetic coil 102.

Two of the probe pins 111a, 111b are coupled to the write element on the magnetic head 101 under test and provide the positive and negative write signals (W+ and W−) to the write element. These probe pins are electrically coupled to a write circuit 114, which is, e.g., a write current source similar to that used in a disk drive device. The write circuit 114 provides a write current to the inductive write element on the magnetic head 101. The write circuit 114 is connected to the processor 106 and controls the magnitude and frequency of the current in response to signals provided by processor 106.

Two of the probe pins 111c and 111d are coupled to the MR read element on the magnetic head and provide the positive and negative read signals (R+ and R−) to the MR read element. The probe pins are connected to a bias circuit 116 that is used to provide a bias current or bias voltage to the MR read element on the magnetic head 101. The bias circuit 116 may include, e.g., a constant current (or voltage) source. When a bias current is used, tester 100 measures fluctuations in voltage and vice versa. The probe pins 111c and 111d are connected to the noise detection circuit 130 through a read back amplifier circuit 120 (illustrated in FIG. 2). The noise detection circuit 130 is connected to the processor 106 and is used to detect noise of interest, e.g., Barkhausen noise or other noise.

If desired, additional circuitry may be coupled to the output of the MR read element for additional measurements of the magnetic head, e.g., a circuit for measuring ρ-H characteristics of the head. It should be understood that the testing device 100 is one example of a testing device that may be used with the present invention. Testing device 100, may be e.g., a QST-2002 tester manufactured by Integral Solutions International, located in San Jose, Calif. If desired other testing devices may be used to test magnetic heads before they are connected to the suspension, e.g., when the head is still on the bar, such as the type disclosed in U.S. patent application Ser. No. 2001/048,303 A1, or after mounting of the head gimbal assembly to an actuator assembly for testing either as an assembly or when installed into an actual hard disk drive.

Figure 2:
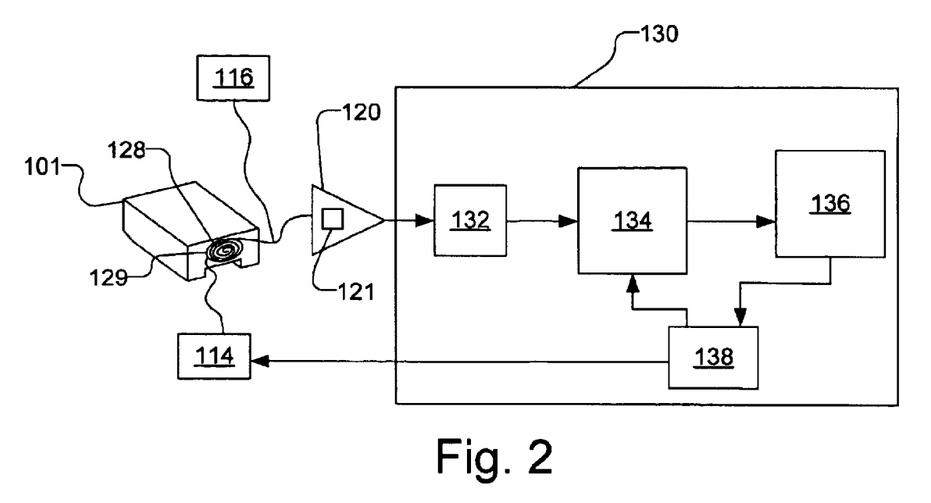
FIG. 2 is a schematic view of the noise detection circuit of FIG. 1.

FIG. 2 is a schematic view of the noise detection circuit 130. As illustrated in FIG. 2, an MR read head element 128 on the MR magnetic head 101, which is mounted on the suspension 108 shown in FIG. 1, is connected to read head amplifier circuit 120 in detection circuit 130. The MR read head element 128 is also connected to the bias circuit 116. The output terminal of the amplifier circuit 120 produces a high-frequency output of approximately 1 MHz to several hundreds MHz with gain of 270:1. The amplifier circuit 120 may include a high pass filter 121 that eliminates signals from approximately 0 to 1 MHz. Of course, if desired, high pass filter 121 may be external to amplifier 120. It should be understood that the specific output frequency of the amplifier circuit 120 may be varied to any desired frequency by altering the high pass filter 121. The amplifier circuit 120 is connected to a low pass filter 132 in noise detection circuit 130. The low pass filter 132, for example, may pass signals with a frequency less than approximately 80 MHz. Of course, any desired output frequency may be produced with an appropriate low pass filter 132, e.g., up to approximately 200 MHz or more. Thus, the resulting read channel bandwidth is between the cutoff frequencies of the high pass filter 121 in the amplifier circuit 120 and the low pass filter 132, e.g., between approximately 1 MHz to 80 MHz.

The use of a high-frequency output advantageously eliminates the DC voltage across the MR read head element 128. In addition, because the magnetic field cycles at a low frequency, e.g., up to 1 kHz, the band pass of the read channel (the combined low pass filter 132 and the high pass filter 121 that is part of the amplifier circuit 120) eliminates of the magnetic field cycle frequency. It should be understood that if desired, the magnetic field in fact may be held at a single steady magnitude. The output terminal of the low pass filter 132 is coupled to a digitizer 134, which may be, e.g., a 10 bit digitizer with a 160 MHz sampling rate.

The digitizer 134 is coupled to a processor 136, which performs the desired analysis on the digitized data. For example, processor 136 may perform a Fast Fourier Transform (FFT) or Autocorrelation on the data, or derive the root mean square (RMS) values for the data. The process includes a computer-usable medium having computer-readable program code embodied therein for causing the processor to perform desired analysis. For example, the code embodied on the computer-usable medium may cause the processor to perform a root mean square calculation on the digitized output signals and/or a Fast Fourier Transform or Autocorrelation on the digitized signals to determine if the magnetic head produces noise. For example, the program code to perform the RMS, FFT, and/or Autocorrelation calculations may be MathLab or Measurement Studio. It should be understood that a separate processor 136 may be used with noise detection circuit 130 or if desired, processor 106 shown in FIG. 1 may be used in place of processor 136.

A timing circuit 138 is connected between processor 136 and digitizer 134. Timing circuit 138 controls when digitizer 134 digitizes data produced by MR read head element 101. Timing circuit 138 is also connected to the write circuit 114 and controls when write circuit produces a current to the write element 129 on the MR magnetic head 101.

Figure 3:
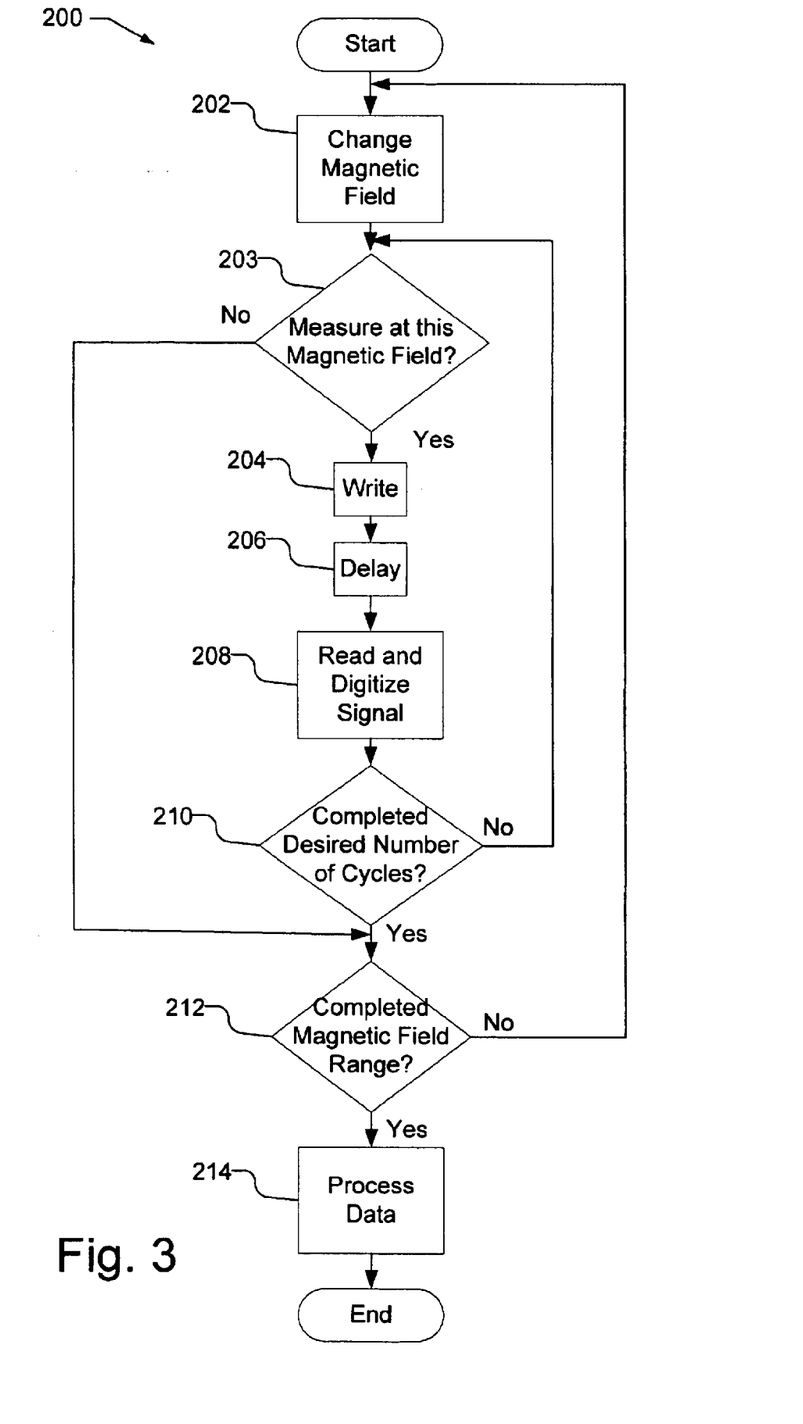
FIG. 3 is a flow chart illustrating a part of the control program used by the processor in testing an MR magnetic head.

FIG. 3 is a flow chart 200 illustrating a part of the control program of processor 106 used in the method of testing an MR magnetic head. As illustrated in FIG. 3, a magnetic field is produced by electromagnetic coil 102 (block 202). A write current is then produced to excite the write element to produce a write event (block 204), followed by a delay (block 206), after which a read event (block 208) is performed, i.e., output signals from the read element 128 on the magnetic head 101, shown in FIG. 2 are received and digitized. The output signals from the read event, e.g., are stored in digitizer 134.

The timing circuit 138 is used to control the length of the write event, the delay and the read event, all of which may be programmable. For example, the write event may be 0 to 50 μs, the delay may be 0 to 1 μs, and the read event may be 10 to 50 μs. Thus, if desired, the write event and/or the delay may be eliminated from the testing of the magnetic head. Of course, the length of any of these events may be altered. In addition, the particular magnetic field at which an event is performed may be programmed. For example, read and write events may be programmed to occur only at specific magnetic field values or between specific magnetic field ranges as illustrated by block 203.

Figure 4A:
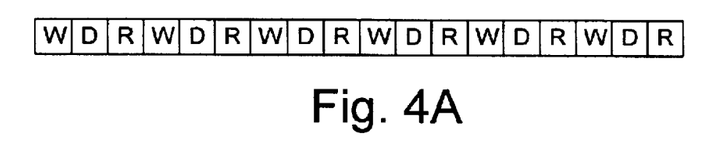
FIG. 4A shows six cycles of write, delay and read events.
Figure 4B:
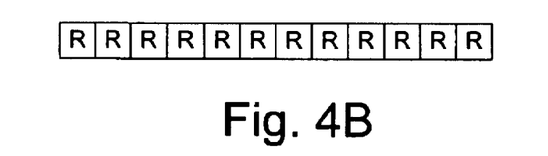
FIGS. 4B and 4C show a number of cycles and a single cycle, respectively, in which there are no write or delay events.
Figure 4C:
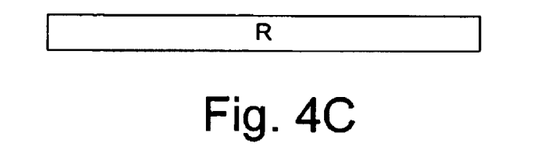

To generate a valid sampling, a number of read events or a single long read event must be digitized. Thus, for example, a number of cycles of write, delay, and read events may be performed. FIG. 4A, for example, shows six cycles of write, delay and read events. Of course, many additional cycles, e.g., 1,000 to 10,000 or more cycles, should be used to generate a valid sampling of read events. The desired number of cycles may also be programmable. FIG. 4B shows a number of cycles, in which there are no write or delay events, in other words, only read events are used. As shown in FIG. 4C, a single long read event may be used in place of multiple short read events. Timing circuit 138 in FIG. 2 controls the length and frequency of the write, delay, and read events and ensures that the read signal is digitized at the appropriate time, i.e., after the write and delay events are complete.

As shown in FIG. 3, if the desired number of cycles has not been completed (block 210), the process flows back to block 204. Once the desired number of cycles is performed, a determination is made if the desired magnetic field range has been covered (block 212). The magnetic field range may be programmable to range from −1000 Oe to +1000 Oe in 0.1 Oe increments or greater. If the entire magnetic field range has not been covered, the process flows back to block 202.

Figure 5A:
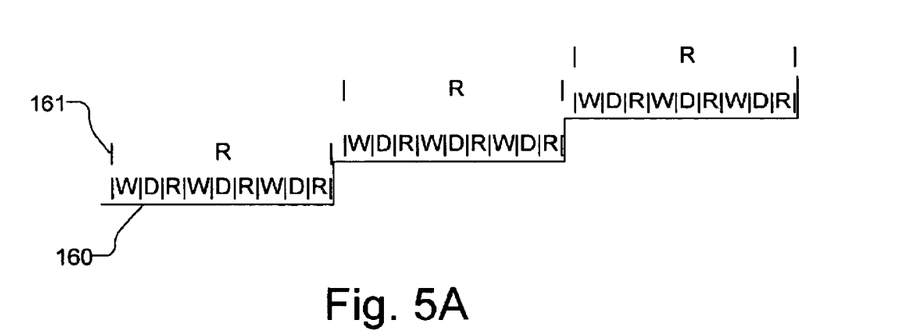
FIG. 5A illustrates graphically the incremental change in the magnetic field while a number of write, delay and read events occur at each increment of the magnetic field.

FIG. 5A illustrates graphically one embodiment of the incremental change in the magnetic field. Only three incremental changes are shown in FIG. 5A, but it should be understood that many incremental changes may be performed. As illustrated by lines 160, the magnetic field changes in increments while a number of write, delay and read events occur at each increment of the magnetic field. Alternatively, as also illustrated in FIG. 5A, a single read event 161 may be performed at each increment of the magnetic field. It should be understood that the single read event may be a number of read events that occur in succession. In other embodiments, if desired, a single write and delay event may be followed by a number of read events or a single read event.

Figure 5B:
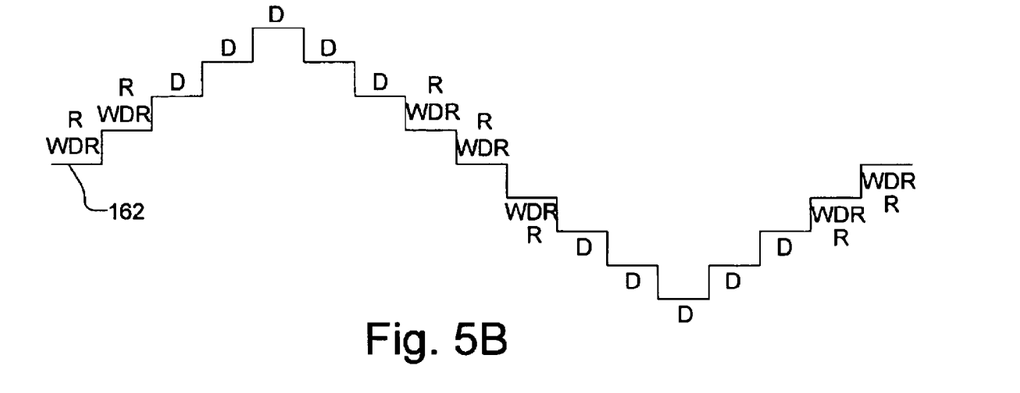
FIG. 5B illustrates graphically an incremental change in the magnetic field while a number of write, delay and read events occur at selected increments of the magnetic field.

FIG. 5B illustrates graphically another embodiment of the incremental change in the magnetic field. As illustrated by line 162 the magnetic field changes incrementally over a cycle that has a range of magnitudes. During each increment one or more write, delay and/or read events may be performed. As shown in FIG. 5B, at the peaks of the magnetic field, read and write events are not performed. The write, delay and/or read events are performed during a selected subset of the range of the magnetic field, e.g., between the peaks of the field. For example, the write, delay and/or read events are performed when the magnetic field is near zero, such as ±100 Oe. The particular magnetic field or field ranges at which the read events are performed may be selected by the user. Of course, if desired, the write, delay and/or read events may be performed at the peak magnetic field values, while only a delay event occurs between the peak magnetic field values. It should be understood that if desired, the write, delay and/or read events may be performed over the entire range of the magnetic field, but the data from the read events is digitized only during the desired subset of the range.

Once the entire desired range of magnetic field has been covered, the digitized data may be processed by processor 136 (block 214). Because the read data has been digitized, the processor 136 may analyze the data in many desirable ways. Moreover, it should be understood the analysis may be performed before all data has been digitized. For example, the processing block 214 may be performed, at least in part, before block 212 if desired.

Advantageously, by using a digitizer to digitize and store the data, a processor can process the data after some or all of the data collection is completed. For example, using the digitized data, a spectral analysis of a noise event may be performed, e.g., by performing a FFT. Timing synchronization of the event may also be performed using the digitized data, i.e., the timing of a noise during a read event can be extracted from the digitized data. The digitized data may also be used to determine the absolute maximum and minimum peak noise value in addition to the RMS value. Moreover, the digitized data can be used in post-processing threshold analysis, i.e., after processing, the number of noise counts above a later chosen threshold value or values can be extracted.

Figure 6:
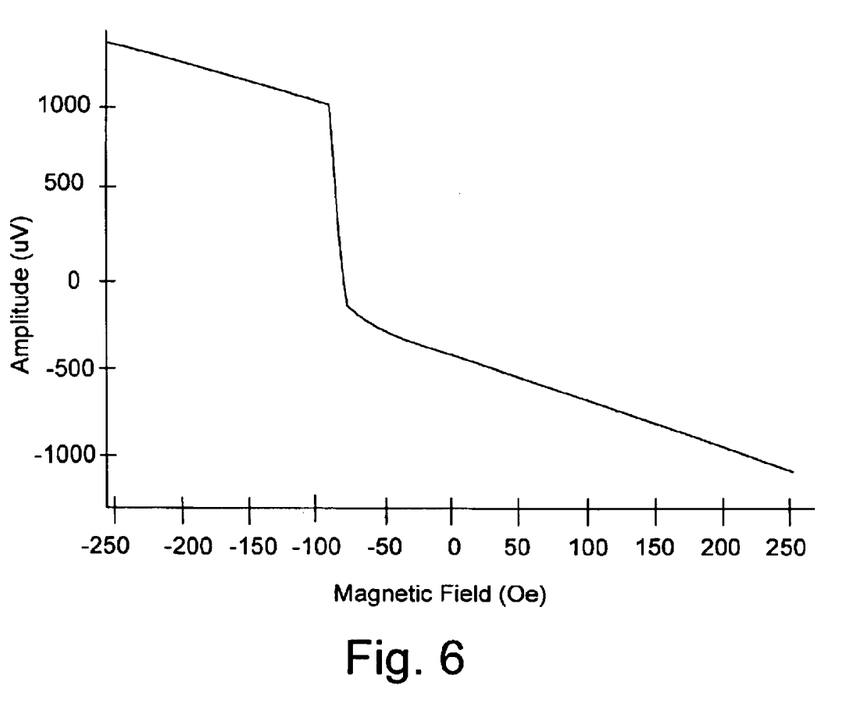
FIGS. 6 and 7 show plots of transverse transfer curves having a hard kink and a soft kink, respectively.
Figure 7:
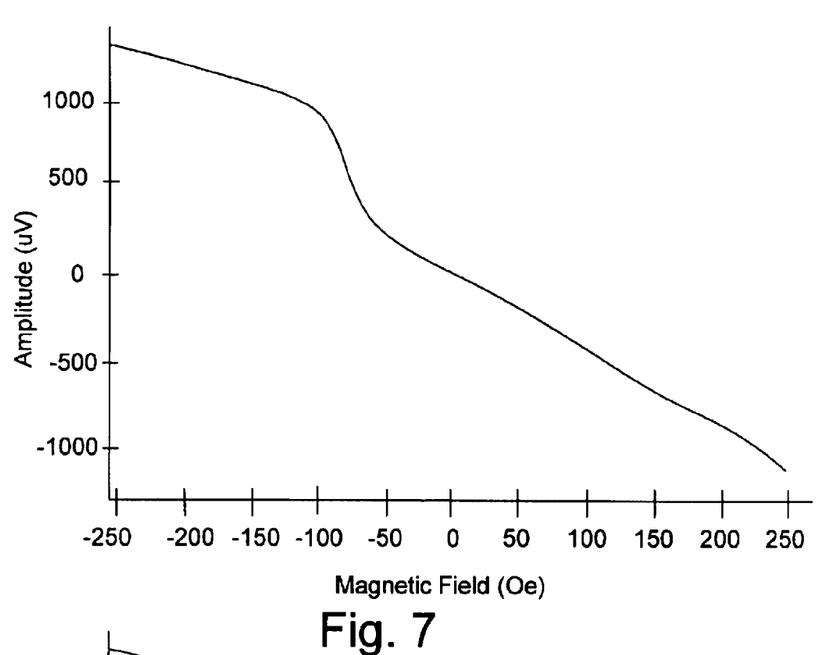

FIGS. 6 and 7 show conventional transverse transfer curves for read heads where the X axes represent the magnetic field and the Y axes represent the voltage amplitude in μV. As can be seen in FIG. 6, a curve shows a large change in slope at approximately −75 Oe, which is sometimes referred to as a "hard kink". The large change in slope is easily noticeable and quantifiable. It should be understood FIG. 6 shows one half cycle, i.e., measurement from, e.g., +250 OE to −250 OE, and that the measurement of a full cycle may show hysteresis.

FIG. 7 is similar to FIG. 6, however, FIG. 7 shows only a gradual slope change between −100 and −50 Oe. The gradual slope change, sometimes referred to as a "soft kink" is difficult to quantify, particularly using a conventional measurement system. Nevertheless, the soft kink shown in FIG. 7 may affect the performance of the magnetic head.

Figure 8:
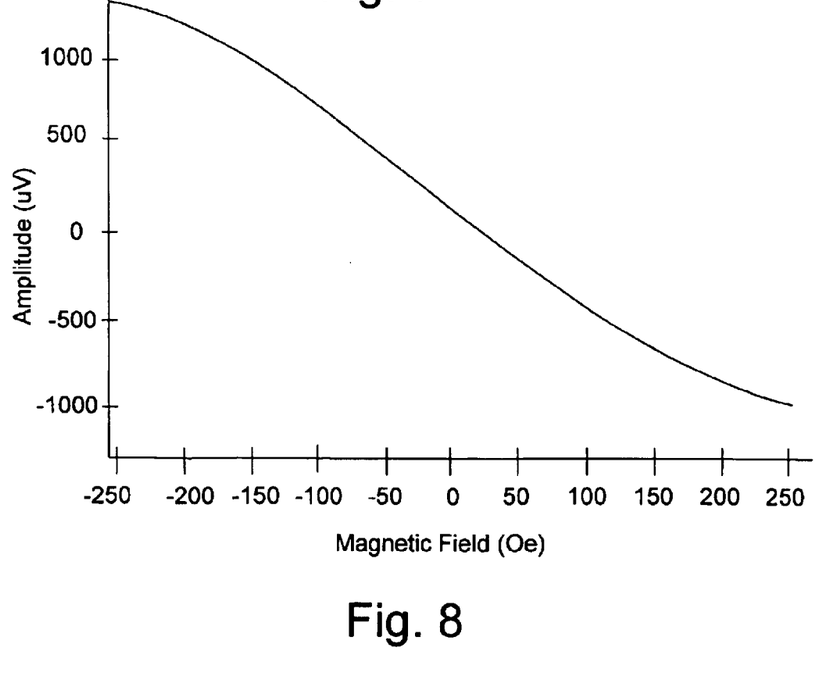
FIG. 8 shows a plot of transverse transfer curve having no defects.

By way of comparison FIG. 8 shows a transverse transfer curve for another read head where the curve has no noticeable hard or soft kinks. Thus, the read head, which produced the curve shown in FIG. 8, would produce an approximately linear and stable readback signals within the normal operating range.

Figure 9:
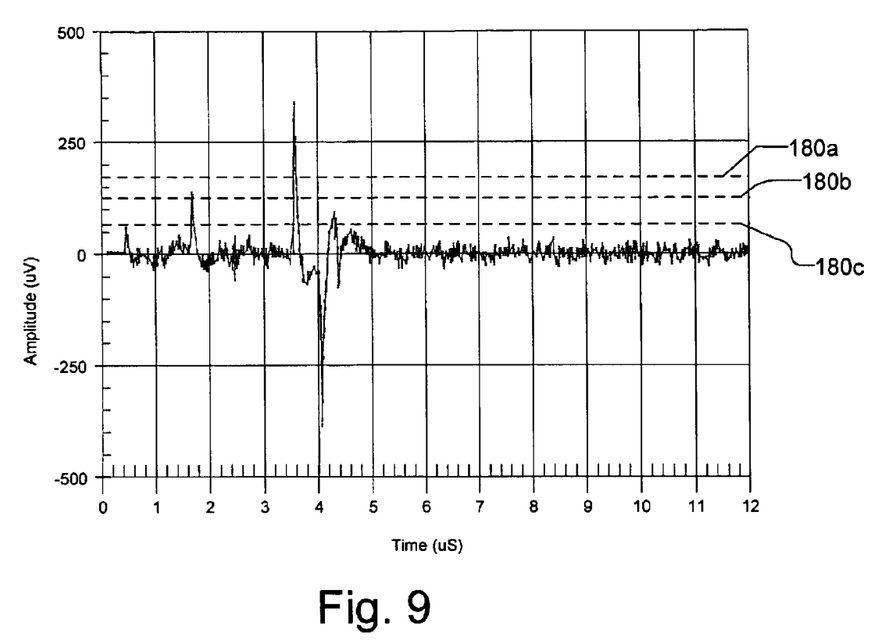
FIG. 9 shows a graph of digitized data from a magnetoresistive read head element in accordance with the present invention.

FIG. 9 shows a graph of digitized data from a magnetoresistive read head element in accordance with the present invention. The Y axis of FIG. 9 represents the output of the read head element in μV and the X axis represents time with respect to the end of a write operation, i.e., the zero point is the end of a write period. If desired, the data received during a delay period may be digitized, i.e., both the delay and read periods are digitized, but only the data during the read period is used in the analysis of the head. It should be understood that the graph of FIG. 9 shows only one read event during a test. To generate a valid sampling, however, it is desirable to perform and digitize a number of read events, e.g., 1,000 or more.

Figure 10:
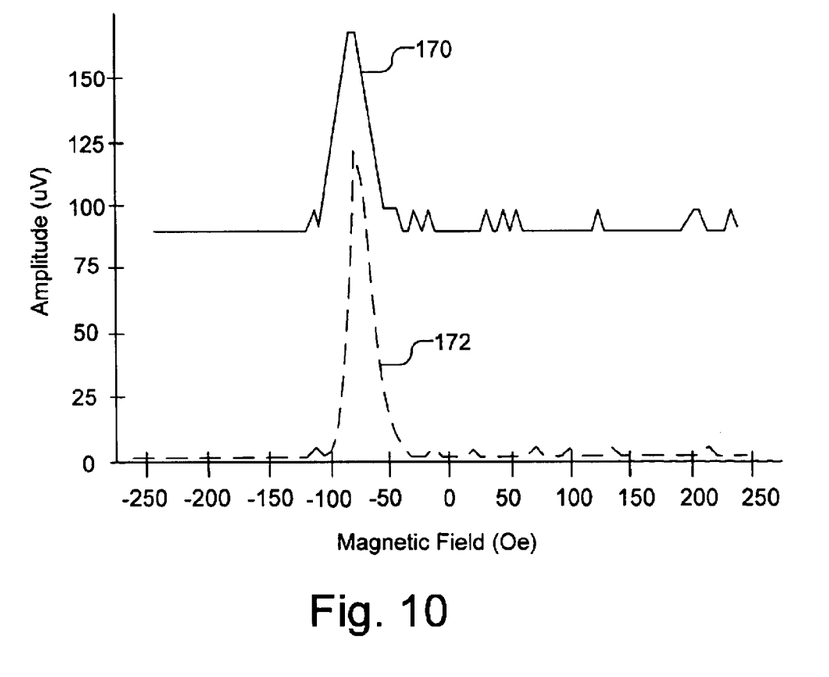
FIG. 10 shows a plot of the spectral maximum amplitude noise in terms of peak value and RMS value for a magnetic head.

Using the digitized data, a number of analyses may be performed by processor 106. For example, the peak and RMS values of the noise may be measured. FIG. 10 shows a plot of the spectral maximum amplitude noise for a magnetic head, where the X axis represents the magnetic field from −250 Oe to 250 Oe, and the Y axis represent the voltage of the noise in $\mu V$. The solid line 170 represents the maximum noise amplitude, i.e., peak noise, and the broken line 172 represents the RMS value of the noise.

Based on the peak and RMS values, the processor 106 can determine the maximum peak and RMS noise values from the data. This determination may be made independent of the magnetic field, or may be based on a particular subset of the magnetic field range, e.g., between ±100 Oe or at a particular magnetic field value. In addition, to generate the total noise, the RMS noise may be summed (i.e., integrated) across all the magnetic field values or subset of field values. Other standardized distribution parameters may also be calculated, such as average, standard deviation, variance, and median.

Additionally, a weighted average of the RMS noise may be generated around a desired field value. For example, if a weighted average of the RMS noise is desired around zero, the noise around that value is summed using a noise(x)/x function (where the noise near zero has a larger weight than the noise far from zero).

The signal-to-noise ratios may be calculated by determining the signal amplitude at some desired magnetic field strength using, e.g., the well known $\rho$-H technique, and dividing by any of the above noise values, e.g., in the form of 20 log(Vsignal/Vnoise).

In addition, using the digitized data, timing synchronization can be performed. For example, as shown in FIG. 9, the timing from the end of the write event (or if write event is disabled from the start of read event) to the peak of the pulse may be accurately measured. If desired, the time from peak to peak may also be determined.

The digitized data can be used in post-processing threshold analysis. As shown in FIG. 9, one or more threshold values, illustrated as lines 180a, 180b, and 180c, can be used to determine the number of noise pulses in a read cycle. If desired multiple threshold values be used or the threshold values may be varied. Thus, as shown in FIG. 9, it can be seen that one pulse exceeds threshold 180a, two pulses exceed threshold 180b and three pulses exceed threshold 180c. Of course, if desired, negative thresholds may be used.

With all the data digitized, it is possible to count the number of pulses detected per read event, e.g., pulses that exceed a particular threshold. The read events in which a noise occurs can then be reported, along with the corresponding number of pulses in the read event.

Figure 11:
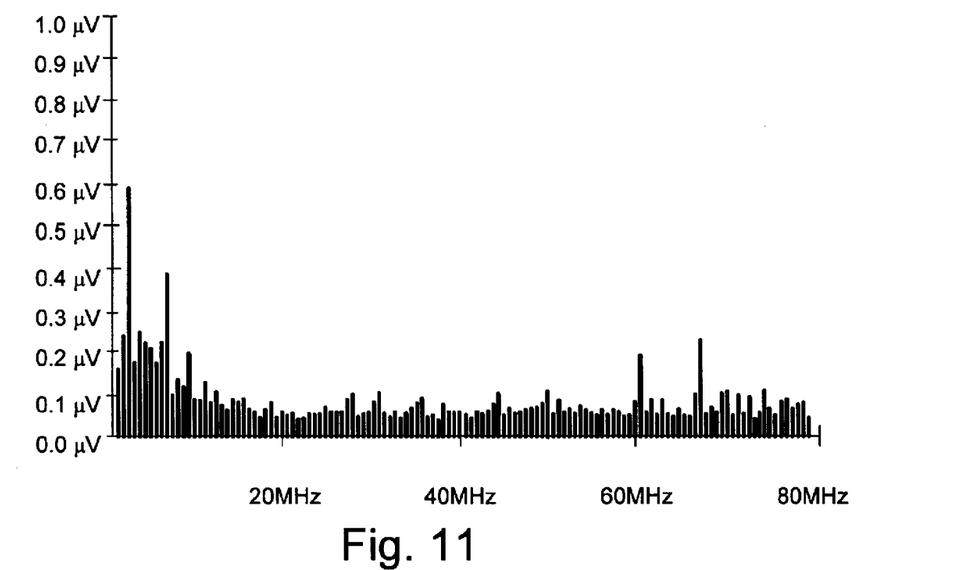
FIGS. 11 and 12 illustrate the Fast Fourier Transforms of the RMS voltage of the head noise as a function of frequency content at two different magnetic field values.
Figure 12:
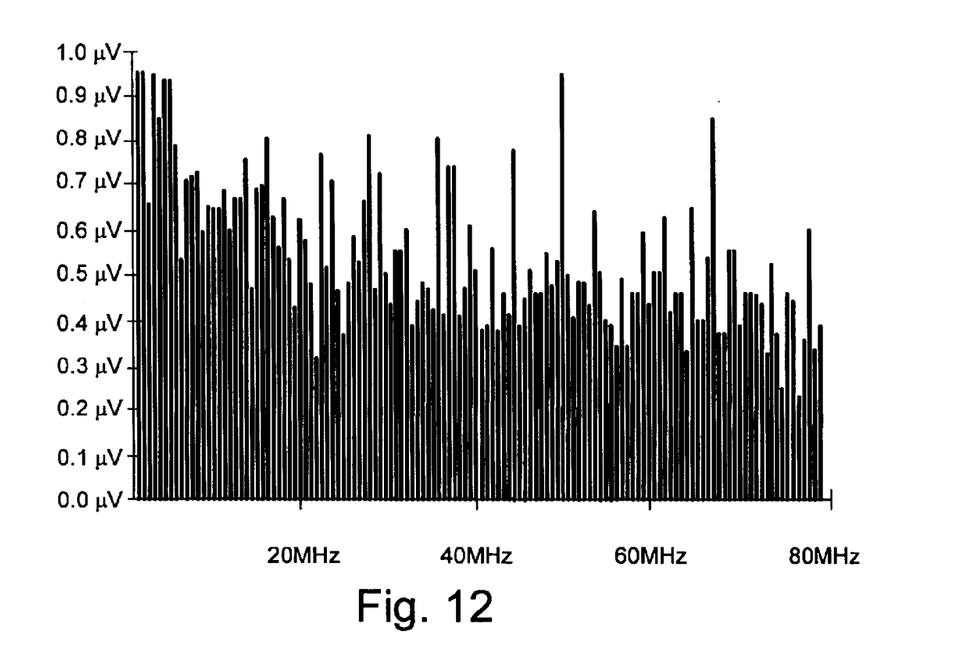

As discussed above, a Fast Fourier Transform (FFT) may be performed on the digitized data. FIGS. 11 and 12 illustrate the FFT of the RMS voltage of the head noise as a function of frequency content. For example, FIG. 11 corresponds to +75 Oe, of FIG. 10, where the read head element was stable, thus resulting in low noise. FIG. 12, however, corresponds to −75 Oe of FIG. 10, where there is a large amount of noise.

In addition, Autocorrelation, sometimes referred to as self-correlation, may be performed using the digitized data. Autocorrelation refers to the correlation of the signal with itself and is well known in the art as a technique of detecting periodic components within the data.

Moreover, the present invention may be used to simultaneously perform tests for instabilities caused by fluctuation in the magnetic field as well as tests for noises caused by write events. Because the present invention includes a write, delay, read cycle, the noise caused by the heating/cooling of and field generated by the write element during and after a write event can be examined. Thus, the present invention permits measurement of both the write-induced noise along with other magnetic field induced instability noises. By analyzing the timing of a noise event using the digitized data it is possible to determine the source of the noise, e.g., if a noise consistently occurs immediately after a write event, the noise is most likely write induced.

Conventionally, as discussed in U.S. patent application Ser. No. 2001/0048303 A1, a threshold range is used to determine if noise is occurring. Thus, the read event is compared to a preset threshold range. If the read signal is outside the threshold range, the event is considered noise. The number of noise events are counted and if the occurrence frequency is greater than a desired limit, the magnetic head is determined to be faulty. Thus, the conventional system performs a simple pass/fail analysis. The present invention, however, provides a more detailed and useful measurement of the performance of the magnetic head.

It is also known that by sweeping the threshold values during testing of a head (or by applying the read signal to a plurality of threshold values), the peak amplitude of the noise may be obtained. However, sweeping the threshold values is time consuming resulting in lower throughput. Moreover, the results of such a test have limited use as it provides only the peak value of the noise and a distribution of noise counts per threshold value, which is limited to the resolution of the variations in threshold tested. Thus, the present invention again provides a more detailed and useful measurement of the performance of the magnetic head and does so in significantly less time, thereby improving throughput.

Figure 13:
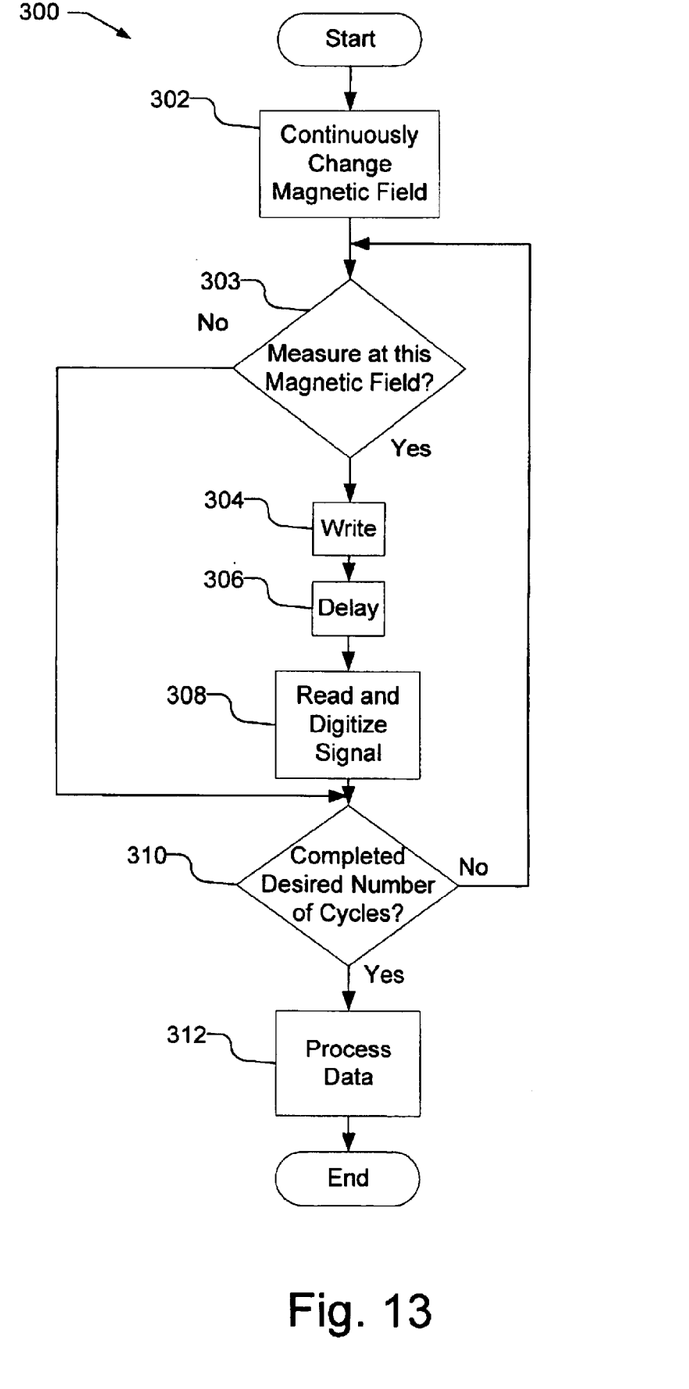
FIG. 13 is a flow chart illustrating another embodiment of the control program used by the processor in testing an MR magnetic head.

FIG. 13 is a flow chart 300 illustrating another embodiment of the control program of processor 106 used in the method of testing an MR magnetic head. Flow chart 300 is similar to flow chart 200 shown in FIG. 3, except the magnetic field is caused to continuously change (block 302) as opposed to change in small DC increments. As can be seen in FIG. 13, the write, delay, and read events are performed for the desired number of cycles (blocks 304, 306, 308, and 310), while the magnetic field continuously changes over the entire range or over a subset of ranges, as illustrated by block 303. The multiple cycles, however, are sampled along with the change in the magnetic field. However, because the magnetic field changes at a relatively slow rate, e.g., up to 1 kHz, and the read event is approximately 10 to 50 $\mu s$, the changing magnetic field will have little affect on the data from any one read event, i.e., the magnetic field will appear to have a constant magnitude during any one read event. The data is then processed (block 312), e.g., to calculate the RMS value, FFT and/or Autocorrelation analysis, timing synchronization, peak value, or threshold analysis.

Figure 5C:
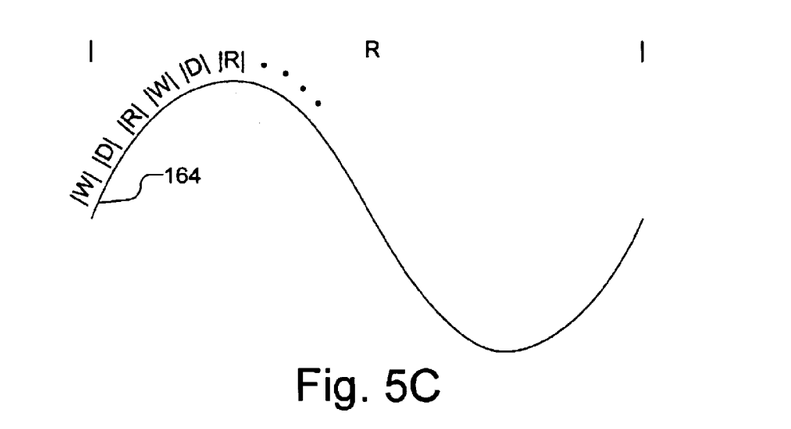
FIG. 5C illustrates graphically a continuous change in the magnetic field while a number of write, delay and read events occur as the magnetic field varies.

FIG. 5C illustrates graphically the continuous change in the magnetic field, illustrated by line 164. As shown in FIG. 5C, as the magnetic field continuously changes, a number of write, delay and read events are performed. Alternatively, a single read event may be performed while the magnetic field continuously changes. It should be understood that the single read event may be a number of read events that occur in succession. In other embodiments, if desired, a single write and delay event may be followed by a number of read events or a single read event.

Figure 5D:
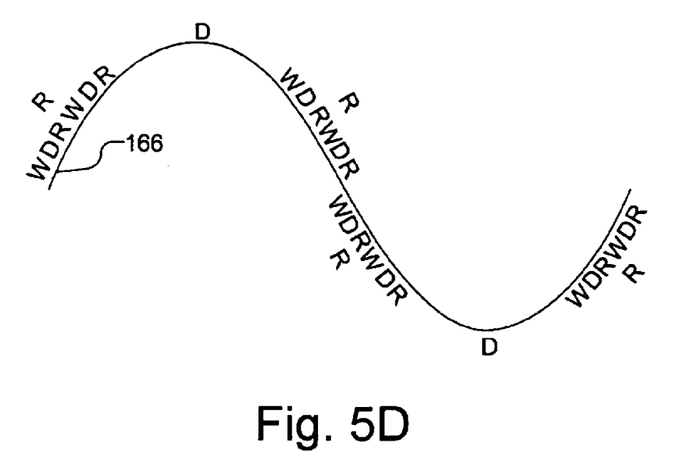
FIG. 5D illustrates graphically a continuous change in the magnetic field while a number of write, delay and read events occur at selected ranges of the varying magnetic field.

FIG. 5D illustrates graphically another embodiment of the continuous change in the magnetic field illustrated by line 166. Similar to the embodiment shown in FIG. 5B, at the peaks of the magnetic field, read and write events are not performed, while the write, delay and/or read events are performed between the peaks of the magnetic field. The particular magnetic field or field ranges at which an event is performed may be programmed. Of course, if desired, the write, delay and/or read events may be performed at the peak magnetic field values, while only a delay event occurs between the peak magnetic field values.

It should be understood that the magnetic field may change cyclically, but does not necessarily have to be in the form of a sine wave as shown in FIGS. 5C and 5D. For example, the magnetic field may vary in the form of a triangle wave or other appropriate continuous waveform.

In another embodiment, instead of digitizing the data (as shown in blocks 208 and 308 in FIGS. 3 and 13) and using a processor to calculate the RMS values of the data, an RMS meter may be used. For example, as shown in FIG. 2, the digitizer 134 may be replaced with an RMS meter. However, with the use of an RMS meter, that data is not digitized. Consequently, many of the advantages of the use of digitized data are lost, i.e., performing spectral analysis, timing synchronization, peak noise values, and post-processing threshold analysis.

Although the invention has been described with reference to particular embodiments, the description is only an example of the invention's application and should not be taken as a limitation. Various other adaptations and combinations of features of the embodiments disclosed are within the scope of the invention as defined by the following claims.

What is claimed is:

1. A method of testing a magnetic head with a magnetoresistive effect read head element, the method comprising:
   applying a variable external magnetic field to said magnetic head; wherein said applying a variable external magnetic field comprises continuously changing the magnitude of a magnetic field, the continuously changing magnetic field having a cycle frequency;
   receiving at least one output signal from said magnetoresistive effect read head element;
   filtering said output signal using a filter that includes any magnetic field frequency produced during the varying of the variable external magnetic field; wherein filtering said output signal eliminates the magnetic field cycle frequency;
   digitizing said output signal from said magnetoresistive effect read head element; and
   processing the digitized output signal to determine if the magnetic head produces noise.

2. The method of claim 1, wherein said processing the digitized output signal comprises calculating the root mean square.

3. The method of claim 1, wherein said processing the digitized output signal comprises performing at least one of a Fast Fourier transform and an Autocorrelation.

4. The method of claim 1, wherein said magnetic head further includes a write element, said method further comprising: applying a write current to said write element; and delaying for a period of time after applying said write current and prior to digitizing an output signal from said magnetoresistive effect read head element; wherein said output signal is received and digitized while said variable external magnetic field continuously changes.

5. The method of claim 1, wherein said processing the digitized output signal comprises determining the number of pulses in said output signal that exceed one or more thresholds.

6. The method of claim 1, wherein said external magnetic field varies over a range and wherein said digitizing said output signal comprises digitizing an output signal that occurs during a selected subset of said range of external magnetic field.

7. The method of claim 6, wherein said selected subset of said range excludes a range of magnetic fields around the maximum and minimum of the variable external magnetic field.

8. The method of claim 1, wherein said applying a variable external magnetic field comprises applying a series of steady magnitude magnetic fields.

9. The method of claim 8, wherein filtering said output signal is performed using a filter that includes at least zero Hertz.

10. The method of claim 1, wherein filtering is performed using a high pass filter.

11. The method of claim 1, wherein filtering said output signal is performed after digitizing said output signal.

12. The method of testing a magnetic head with a magnetoresistive effect read head element and a write element, the method comprising:
    applying a variable external magnetic field to said magnetic head, wherein said applying a variable external magnetic field comprises applying a series of steady magnitude magnetic fields;
    applying a write current to said write element;
    receiving at least one output signal from said magnetoresistive effect read head element;
    filtering said output signal using a filter to filter out at least zero Hertz;
    digitizing said output signal from said magnetoresistive effect read head element;
    delaying for a period of time after applying said write current and prior to digitizing an output signal from said magnetoresistive effect read head element; and
    processing the digitized output signal to determine if the magnetic head produces noise.

13. The method of claim 12, wherein said processing the digitized output signal comprises at least one of calculating the root mean square, a Fast Fourier Transform and an Autocorrelation, and determining the number of pulses in said output signal that exceed one or more thresholds.

14. A method of testing a magnetic head with a magnetoresistive effect read head element and a write element, the method comprising:
    applying a variable external magnetic field to said magnetic head;
    applying a write current to said write element;
    receiving at least one output signal from said magnetoresistive effect read head element;
    filtering said output signal using a filter that includes any magnetic field frequency produced during the varying of the variable external magnetic field;
    digitizing said output signal from said magnetoresistive effect read head element;

delaying for a period of time after applying said write current and prior to digitizing an output signal from said magnetoresistive effect read head element;

processing the digitized output signal to determine if the magnetic head produces noise.

15. The method of claim 14, said method further comprising:

changing said variable external magnetic field to a different magnitude after digitizing a first set of output signals;

receiving and digitizing a second at least one output signal from said magnetoresistive effect read head element; and continuing to change said variable external magnetic field and receive and digitize output signals from said magnetoresistive effect read head element for all desired external magnetic fields.

16. A method of testing a magnetic head with a magnetoresistive effect read head element, the method comprising:

applying a variable external magnetic field to said magnetic head;

receiving at least one output signal from said magnetoresistive effect read head element;

filtering said output signal using a filter that includes any magnetic field frequency produced during the varying of the variable external magnetic field;

digitizing said output signal from said magnetoresistive effect read head element; and processing the digitized output signal to determine if the magnetic head produces noise, wherein said processing the digitized output signal comprises generating a weighed average of the signal around a desired value of the variable external magnetic field.

17. A method of testing a magnetic head with a magnetoresistive effect read head element, the method comprising:

applying a variable external magnetic field to said magnetic head, wherein said applying a variable external magnetic field comprises incrementally varying the magnitude of a magnetic field;

receiving at least one output signal from said magnetoresistive effect read head element; and applying said at least one output signal from said magnetoresistive effect read head element to a root mean square (RMS) meter to determine if the magnetic head produces noise.

18. The method of claim 17, further comprising determining the number of pulses in said output signal that exceed one or more thresholds.

19. The method of claim 17, further comprising:

applying a write current to said write element; and delaying for a period of time after applying said write current and prior to applying an output signal to said RMS meter; and changing the magnitude of said variable external magnetic field after receiving a desired number of output signals from said magnetoresistive effect read head element.

20. The method of claim 17, further comprising:

applying a write current to said write element; and delaying for a period of time after applying said write current and prior to applying an output signal to said RMS meter.

21. A method of testing a magnetic head with a magnetoresistive effect read head element, the method comprising:

applying a variable external magnetic field to said magnetic head wherein said external magnetic field varies over a range;

receiving at least one output signal from said magnetoresistive effect read head element; and applying said at least one output signal from said magnetoresistive effect read head element to a root mean square (RMS) meter to determine if the magnetic head produces noise wherein said applying said at least one output signal comprises applying signals that occur during a selected subset of said range of external magnetic field.

22. The method of claim 21, wherein said selected subset of said range excludes a range of magnetic fields around the maximum and minimum of the variable external magnetic field.

23. An apparatus for testing a magnetic head with a magnetoresistive effect read head element and a write element, the apparatus comprising:

a variable magnetic field generator for applying a variable external magnetic field to said magnetic head;

a write current source coupled to be coupled to said write element;

a filter to be coupled to the magnetoresistive effect read head element and receiving at least one output signal from said magnetoresistive effect read head element, said filter including any magnetic field frequency produced during the varying of the variable external magnetic field;

a digitizer coupled to said filter for digitizing said output signal from said magnetoresistive effect read head element;

a processor coupled to said digitizer, said processor processes said digitized output signal; and a timing circuit coupled to said digitizer, to said processor and coupled to said write current source.

24. The apparatus of claim 23, further comprising a power supply coupled to said variable magnetic field generator, said power supply controlling said variable magnetic field generator to produce a magnetic field with a series of steady magnitude magnetic fields, wherein said filter filters out at least zero Hertz.

25. The apparatus of claim 23, further comprising a power supply coupled to said variable magnetic field generator, said power supply controlling said variable magnetic field generator to produce a magnetic field with a continuously changing magnitude.

26. The apparatus of claim 23, wherein said filter comprises a high pass filter coupled in series with a low pass filter between said digitizer and said magnetoresistive effect read head element.

27. The apparatus of claim 23, wherein said processor comprises a computer-usable medium having computer-readable program code embodied therein for causing said processor to perform at least one of a root mean square calculation on said digitized output signal, a Fast Fourier Transform and an Autocorrelation on said digitized signal to determine if the magnetic head produces noise.

28. An apparatus for testing a magnetic head with a magnetoresistive effect read head element, the apparatus comprising:

a variable magnetic field generator for applying a variable external magnetic field to said magnetic head;

a filter to be coupled to the magnetoresistive effect read head element and receiving at least one output signal from said magnetoresistive effect read head element, said filter including any magnetic field frequency produced during the varying of the variable external magnetic field;

a digitizer coupled to said filter for digitizing said output signal from said magnetoresistive effect read head element; and a processor coupled to said digitizer, said processor processes said digitized output signal, wherein said processor comprises a computer-usable medium having computer-readable program code embodied therein for causing said processor to generate a weighed average of the output signal around a desired value of the variable external magnetic field.

29. A method of testing a magnetic head with a magnetoresistive effect read head element, the method comprising:

applying a steady magnitude external magnetic field to said magnetic head;

receiving an output signal from said magnetoresistive effect read head element;

filtering said output signal using a filter that filters out zero Hertz;

digitizing said output signal from said magnetoresistive effect read head element;

processing the digitized output signal to determine if the magnetic head produces noise;

applying a second steady magnitude external magnetic field to said magnetic head, wherein the second steady magnitude external magnetic field and the first steady magnitude external magnetic field have different magnitudes;

receiving a second output signal from said magnetoresistive effect read head element;

filtering said second output signal using a filter that filters out zero Hertz;

digitizing said second output signal from said magnetoresistive effect read head element; and processing the digitized second output signal to determine if the magnetic head produces noise.

30. An apparatus for testing a magnetic head with a magnetoresistive effect read head element, the apparatus comprising:

a magnetic field generator for applying a steady magnitude external magnetic field to said magnetic head;

a filter to be coupled to the magnetoresistive effect read head element and receiving an output signal from said magnetoresistive effect read head element, said filter filters out at least zero Hertz;

a digitizer coupled to said filter for digitizing said output signal from said magnetoresistive effect read head element; and a processor coupled to said digitizer, said processor processes said digitized output signal;

wherein said magnetic field generator applies a second steady magnitude external magnetic field, wherein the second steady magnitude external magnetic field and the first steady magnitude external magnetic field have different magnitudes, wherein said filter to be coupled to the magnetoresistive effect read head element receives a second output signal from said magnetoresistive effect read head element, said digitizer digitizes said second output signal, and said processor processes said digitized second output signal.

* * * * *